United States Patent
Nikayin et al.

(10) Patent No.: US 9,472,933 B2
(45) Date of Patent: Oct. 18, 2016

(54) CONDUIT LOCKING CONNECTOR

(71) Applicants: Saeed Nikayin, Los Angeles, CA (US);
Kai Zhang, Los Angeles, CA (US);
Gilbert Loera, Los Angeles, CA (US)

(72) Inventors: Saeed Nikayin, Los Angeles, CA (US);
Kai Zhang, Los Angeles, CA (US);
Gilbert Loera, Los Angeles, CA (US)

( * ) Notice: Subject to any disclaimer, the term of this patent is extended or adjusted under 35 U.S.C. 154(b) by 58 days.

(21) Appl. No.: 14/513,430

(22) Filed: Oct. 14, 2014

(65) Prior Publication Data
US 2016/0105012 A1    Apr. 14, 2016

(51) Int. Cl.
*H02G 3/22* (2006.01)
*H02G 3/06* (2006.01)

(52) U.S. Cl.
CPC .................. *H02G 3/0683* (2013.01)

(58) Field of Classification Search
CPC .................................................. H02G 3/0683
USPC ......................................................... 174/665
See application file for complete search history.

(56) References Cited

U.S. PATENT DOCUMENTS

| | | | |
|---|---|---|---|
| 910,765 A * | 1/1909 | Adelman | H02G 3/0683 248/56 |
| 1,793,881 A | 2/1931 | Thomas, Jr. | |
| 2,111,243 A | 2/1937 | Hecht | |
| 2,100,796 A | 11/1937 | Church | |
| 2,454,767 A | 11/1948 | Brushaber | |
| 2,475,574 A | 7/1949 | Taylor | |
| D188,377 S | 7/1960 | Martin | |
| 2,973,212 A | 2/1961 | Rose | |
| 3,174,776 A | 3/1965 | Berger | |
| 3,556,566 A | 1/1971 | Bromberg | |
| 3,746,373 A * | 7/1973 | Prudente | H02G 3/0616 285/154.3 |
| 4,575,132 A | 3/1986 | Nattel | |
| 4,606,562 A | 8/1986 | Saraceno | |
| 4,641,863 A | 2/1987 | Shemtov | |
| 4,989,911 A * | 2/1991 | Van Order | B60J 3/0217 248/27.3 |
| 4,995,647 A | 2/1991 | Carey | |
| D336,282 S | 6/1993 | Guginsky | |
| D339,793 S | 9/1993 | Nardi | |
| D380,197 S | 6/1997 | Garcia | |
| 5,894,109 A * | 4/1999 | Marik | H02G 3/0683 174/650 |
| 7,078,623 B1 | 7/2006 | Sheehan | |
| 8,129,634 B2 | 3/2012 | Sheehan | |
| D666,153 S | 8/2012 | Smith | |

* cited by examiner

*Primary Examiner* — Jenny L Wagner
*Assistant Examiner* — Michael E Moats, Jr.
(74) *Attorney, Agent, or Firm* — Kirk A. Buhler; Buhler & Associates

(57) ABSTRACT

Improvements in a conduit locking connector that connects rigid conduit to an electrical junction box. Rigid conduit provides the benefit of allowing an installer to screw onto the side of the rigid conduit to frictionally lock into the rigid conduit with the conduit locking connector. A screw engages into rigid conduit that provide a hard bearing surface on opposing sides of the screw. This provides minimal bending of the rigid conduit for a firmer grip of the rigid conduit to the conduit locking connector. The conduit locking connector provides a physical interface that locks onto the rigid conduit and locks onto the junction box. The conduit locking connector provides anti-rotation between the rigid conduit and the junction box. Anti-rotation is with tabs that extend below a planar surface of the conduit locking connector and engage into holes in recesses in the junction box.

20 Claims, 4 Drawing Sheets

CONDUIT LOCKING CONNECTOR

CROSS REFERENCE TO RELATED APPLICATION

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention relates to improvements in a connector between conduit and an electrical box. More particularly, the conduit locking connector is secured to a rigid conduit and connects to an electrical junction box and prevents rotation of the electrical box on the rigid conduit.

2. Description of Related Art Including Information Disclosed Under 37 CFR 1.97 and 1.98

When electricity is being wired into a house or building, the wiring is typically jacketed and often routed through conduit. This conduit can be rigid or flexible depending upon the type of installation. From the conduit, an electrical junction box is connected to give access to the wiring, to an outlet or to a control switch. The connection between a rigid conduit and an electrical box ensures that the wiring is protected from outside tampering and harm from unskilled people.

There are a number of ways to connect conduit to an electrical junction box. A number of patents and or publications have been made to address these issues. Exemplary examples of patents and or publication that try to address this/these problem(s) are identified and discussed below.

U.S. Pat. No. 4,995,647 issued on Feb. 26, 1991 to Kevin Carey discloses a Portal Semicylindrical Electrical Connector. This patent uses a split set of collars to give access to the wiring within the conduit. While this electrical connector terminates rigid conduit into an electrical box, it is not an integrated connector that prevents rotation of the electrical box and the rigid conduit.

U.S. Pat. No. 4,641,863 issued on Feb. 10, 1987 to Sami Shemtov discloses a Connector for Coupling a Conduit to a Junction Box. This patent uses a plurality of lips placed on one end of the connector to fit into the opening of a junction box. The connector further uses multiple set screws to secure the coupling to the conduit. While this connector holds the rigid conduit to a junction box, the junction box can rotate and if the junction box is tipped, the junction box can be removed from the connector.

U.S. Pat. No. 3,556,566 issued on Jan. 19, 1971 to M. Bromberg discloses a Coupling. The coupling is formed from sheet metal in a progressive die where the sheet metal is punched and formed into the coupling. The coupling engages into a junction box and then rigid conduit is inserted into the coupling. A screw secures the coupling onto the rigid conduit. This coupling also does not prevent rotation of the junction box on the conduit.

U.S. Pat. No. 8,129,634 issued on Mar. 6, 2012 to Robert K. Sheehen et al., discloses a Conduit Connector. This conduit connector is a die-cast part with a threaded coupling and a split spring washer that creates normal forces on a connected junction box. The conduit connector further uses a set screw to secure the connector to conduit. While this connector provides a connection between the rigid conduit and a junction box, it does not prevent rotation of the junction box on the conduit.

What is needed is a connector that secures rigid conduit to an electrical junction box and prevents free rotation of the conduit and the junction box. This conduit locking connector in this document provides the solution.

BRIEF SUMMARY OF THE INVENTION

It is an object of the conduit locking connector to connect to rigid conduit. A connection to rigid conduit provides a strong support that has minimal flexibility to support the wiring. Most rigid conduit comes in a nominal size of ¾ inch in diameter, but larger and smaller diameters of conduit are used depending upon the gauge and quantity of the wiring that is being routed through the rigid conduit. It should be obvious that for optimal performance a single conduit locking connector can't work with different diameters of rigid conduit, but the dimensions of a conduit locking connector can be adjusted to accommodate nearly any diameter of rigid conduit. Another benefit of using rigid conduit with the conduit locking connector is to provide a hard bearing surface on an opposing side of the screw. This provides minimal bending of the rigid conduit for a firmer grip of the rigid conduit to the conduit locking connector.

It is another object of the conduit locking connector to connect an electrical junction box. An electrical junction box is typically a metal or plastic box where wiring is brought into the box through conduit. Within the box, electrical wires are connected together and or to an outlet, switch or other device. The conduit locking connector provides an interface between the rigid conduit and the junction box. The conduit locking connector provides a physical interface that both locks onto the rigid conduit and locks onto the junction box. In addition, the conduit locking connector provides a termination that connect to the junction box for any length of rigid conduit.

It is still another object of the conduit locking connector to provide anti-rotation between the rigid conduit and the junction box. The anti-rotation is with tabs that extend below a planar surface of the conduit locking connector and engage into holes, depression's or recesses in the junction box. The screw connection of the conduit locking connector to the rigid conduit and the engagement of the tabs in the junction box prevent rotation of the junction box onto the conduit locking connector.

Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING(S)

DETAILED DESCRIPTION OF THE INVENTION

Figure 1:
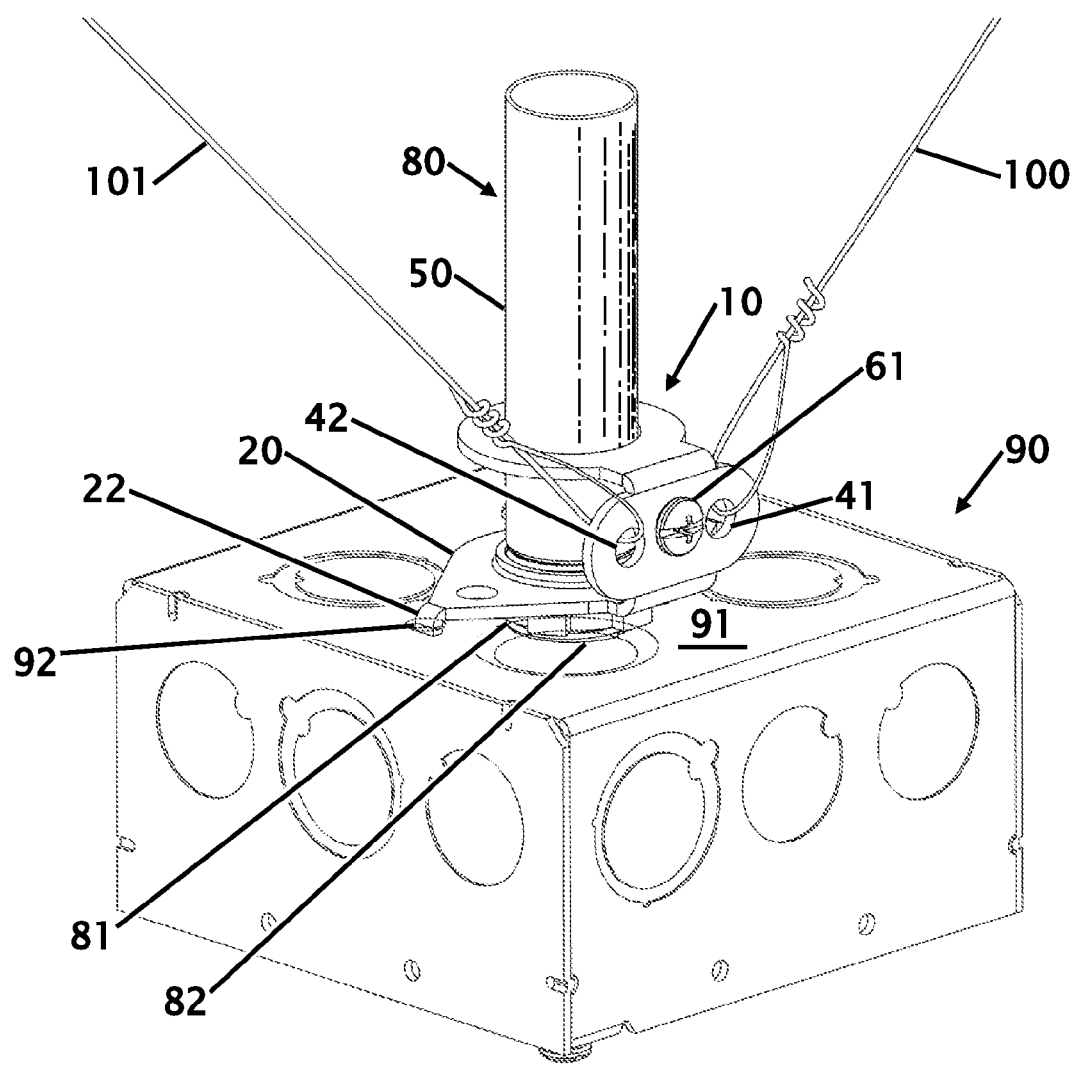
FIG. 1 shows a perspective view of the conduit locking connector connected to a rigid conduit and to a junction box.

FIG. 1 shows a perspective view of the conduit locking connector 10 connected to a rigid conduit 80 and to a junction box 90. The rigid conduit 80 passes through an upper surface 50 and a lower surface 20 of the conduit locking connector 10. The lower surface 20 of the conduit locking connector 10 has bent tabs 22 that engage into holes or openings 92 in the mounting surface 91 of the junction box 90. The threaded end 82 of the rigid conduit 80 is secured in the junction box 90 with a nut 81 that prevents vertical movement of the junction box 90 on the rigid conduit 80. Screw 61 engages into the rigid conduit 80 and prevents rotation of the conduit locking connector 10 on the rigid conduit 80. The amount of penetration of the rigid conduit 80 into the junction box 90 is adjustable depending upon where the conduit locking connector 10 is secured onto the rigid conduit. The conduit locking connector is formed from a single piece of sheet metal that is bent to form the configuration shown and described shape and functions. Other figures show the features of the conduit locking connector 10 in more detail. Holes 41 and 42 allow for the use of spring steel wire 100 and 101 to be tied to the holes and then secured to the surrounding environment. This will prevent the rigid conduit and the junction box 90 from swinging when the building is struck with a seismic event.

Figure 2:
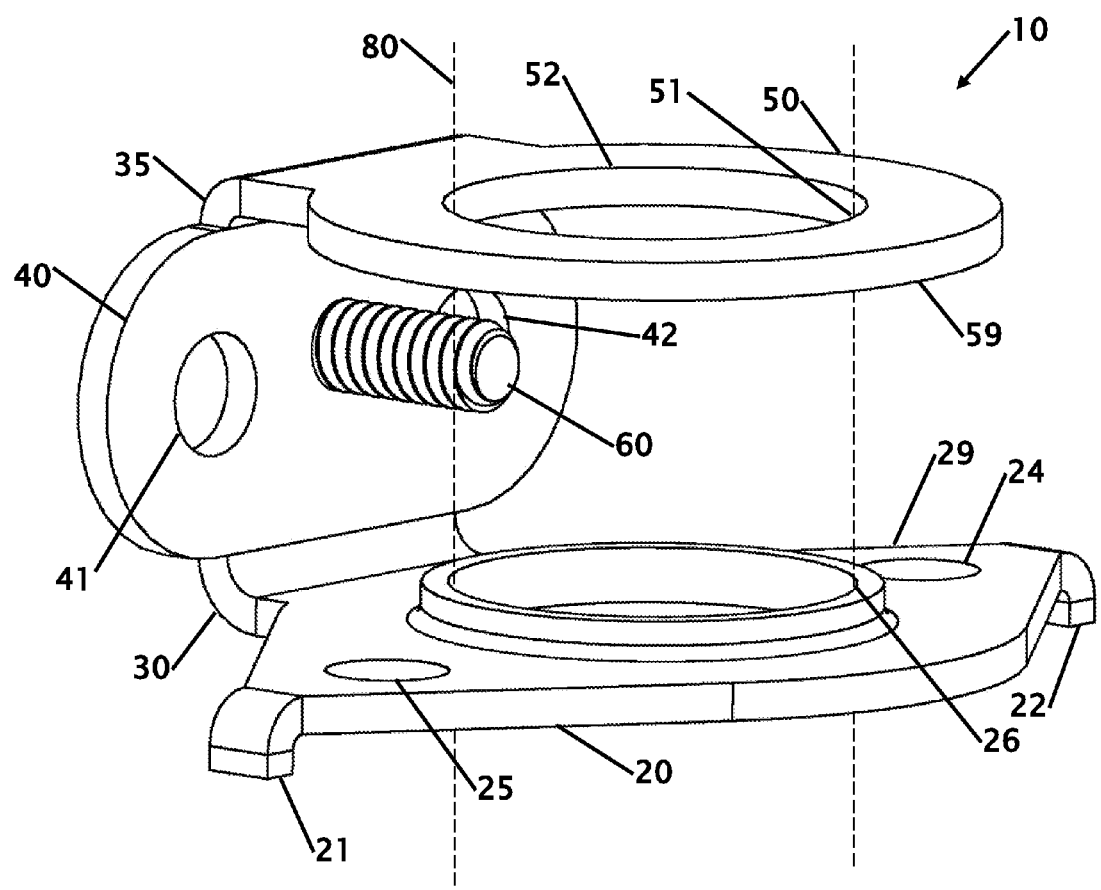
FIG. 2 shows a perspective view of the conduit locking connector.

FIG. 2 shows a perspective view of the conduit locking connector 10. A section of rigid conduit 80 is shown placed through the upper hole 52 and the lower hole 23 of the conduit locking connector 10. The threaded fastener 60 pushes against the rigid conduit 80 and forces the rigid conduit 80 against contact point 51 in the upper hole 52 and against contact point 26 in the lower hole 23. These forces essentially lock the rigid conduit 80 in the conduit locking connector 10. If the threaded fastener 60 is loosened the rotation of the rigid conduit in the conduit locking connector 10 can be adjusted. The upper hole 52 is formed with an upper portion of the conduit locking connector 10 having a top surface 50 and a bottom surface 59. The upper portion provides structural rigidity to support the conduit locking connector 10 and on the rigid conduit 80. The upper portion is supported through a bend 35 to a central vertical support 40.

The central support surface 40 has holes 41 and 42 that can be used for securing spring steel wire or wire tie to surrounding environment to prevent swinging. The central support surface has a tapped hole where the threaded fastener 60 is threaded and provides a structural surface for the fastener 60 to push against the rigid conduit 80. The central vertical support 40 transitions through a second bend 30 to the lower support 20.

The lower support surface 20 of the conduit locking connector 10 has a bottom surface that contacts a junction box (not shown in this figure). A locking nut (not shown) essentially sandwiches the junction box to the bottom surface of the lower support 20. The lower support surface has an extruded, formed or drawn interior lip 26 that is formed above a top surface 29 of the lower support and provides an increased bearing surface for the rigid conduit 80. A plurality of holes 24 and 25 extend through the lower support surface 20. These holes lighten the conduit locking connector 10 and also provide additional securing holes. The location of these holes 24 and 25 exist outside of the outer diameter of the top surface 50. Tabs 21 and 22 exist on the outer extreme edges of the lower support surface 20. These tabs 21 and 22 are bent below the bottom surface of the lower support surface 20. These tabs 21 and 22 extend into complimentary holes (not shown) in the junction box (not shown). When these tabs 21 and 22 are engaged into the holes in the junction box. The junction box is essentially locked to prevent rotation of the junction box on the rigid conduit tube 80.

Figure 3:
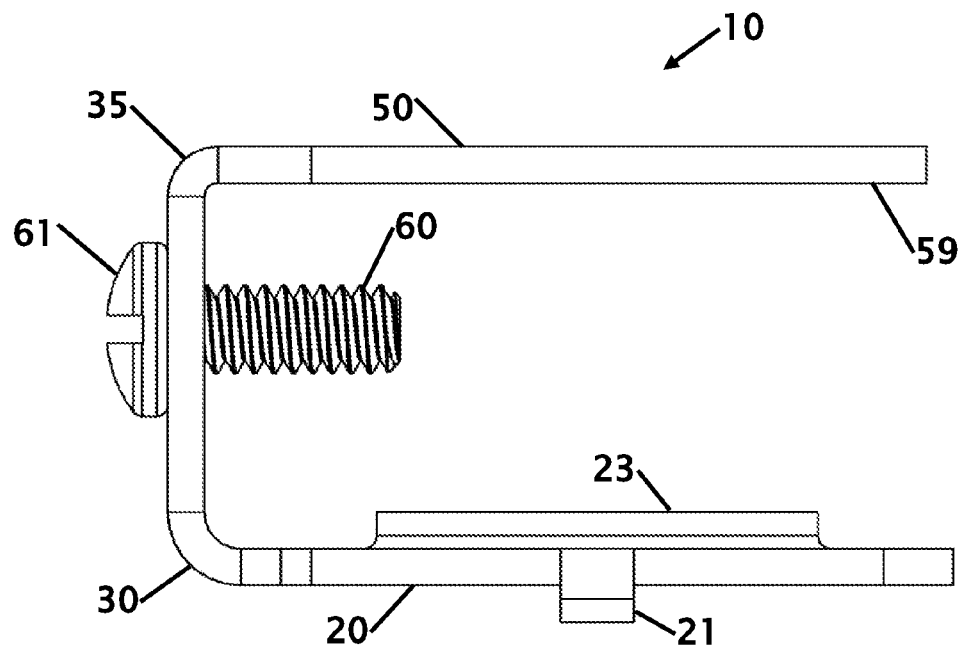
FIG. 3 shows a side view of the conduit locking connector.
Figure 4:
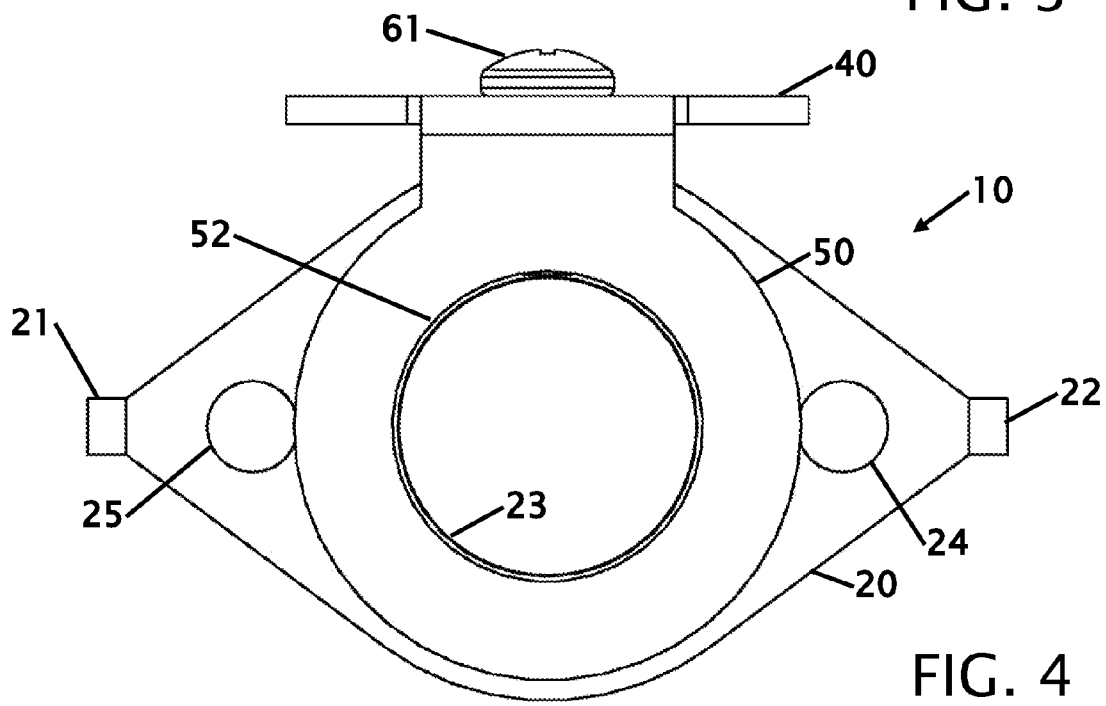
FIG. 4 shows a top view of the conduit locking connector.
Figure 5:
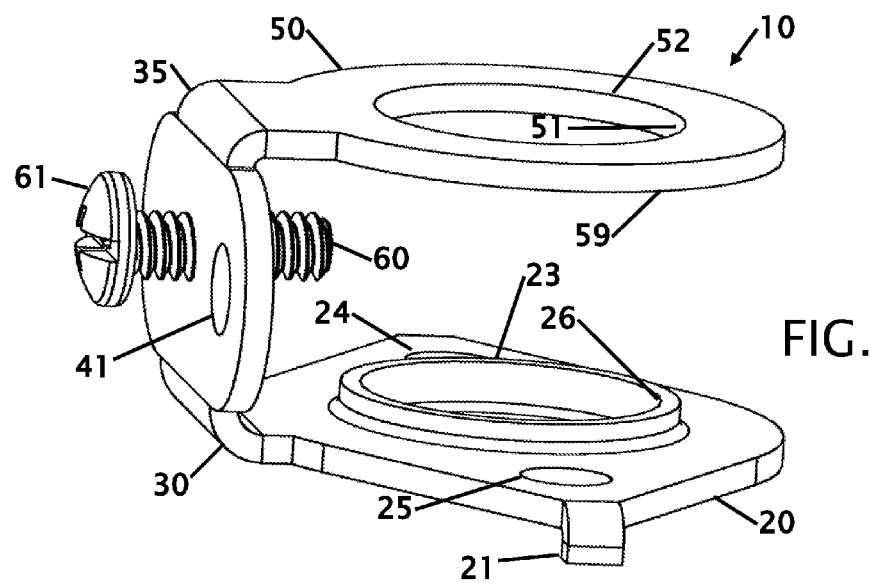
FIG. 5 shows another perspective view of the conduit locking connector.

FIG. 3 shows a side view of the conduit locking connector, FIG. 4 shows a top view of the conduit locking connector and FIG. 5 shows another perspective view of the conduit locking connector. The conduit locking connector 10 has a planar bottom surface 20 and a planar top surface 29 with a plurality of tabs 21 and 22 that extend below said planar bottom surface 20 of the conduit locking connector 10. One or more holes 24 and 25 can be placed through the bottom surface for lightening or providing additional fastening holes. The bottom surface 20 has a central hole 23 with an extruded wall whereby the extruded wall provides an enlarged bearing surface 26 for guiding an inserted rigid conduit and supporting lateral forces on the rigid conduit. A vertical planar surface 40 is bent up 30 from the bottom surface 20.

The vertical planar surface 40 having securing means for a fastener 60. In the preferred embodiment the fastener 60 is a threaded fastener or screw with a head 61 that is screwed into the vertical planar surface 40. One or more holes 41 and 42 can be placed through vertical planar surface 40 to allow for the use of tie wire to prevent swinging when struck or during seismic activity. A planar top surface 50 is bent 35 from said vertical planar surface. The planar top surface 50 has a central hole 52 that is concentric with said central hole 23 in said bottom surface 20.

When a fastener 60 is threaded into the vertical planar surface 40. A conduit (not shown) is placed through said central hole 23 in the planar bottom surface 20 and the central hole 52 in the planar top surface 50 is pushed against 26 of central hole 23 and against 51 of central hole 52. In the planar top surface the conduit is locked into rotational position with the conduit locking connector 10. The tabs 21 and 22 are inserted and locked into the junction box (not shown) to secure and lock rotational movement of the junction box to the rigid conduit.

Figure 6:
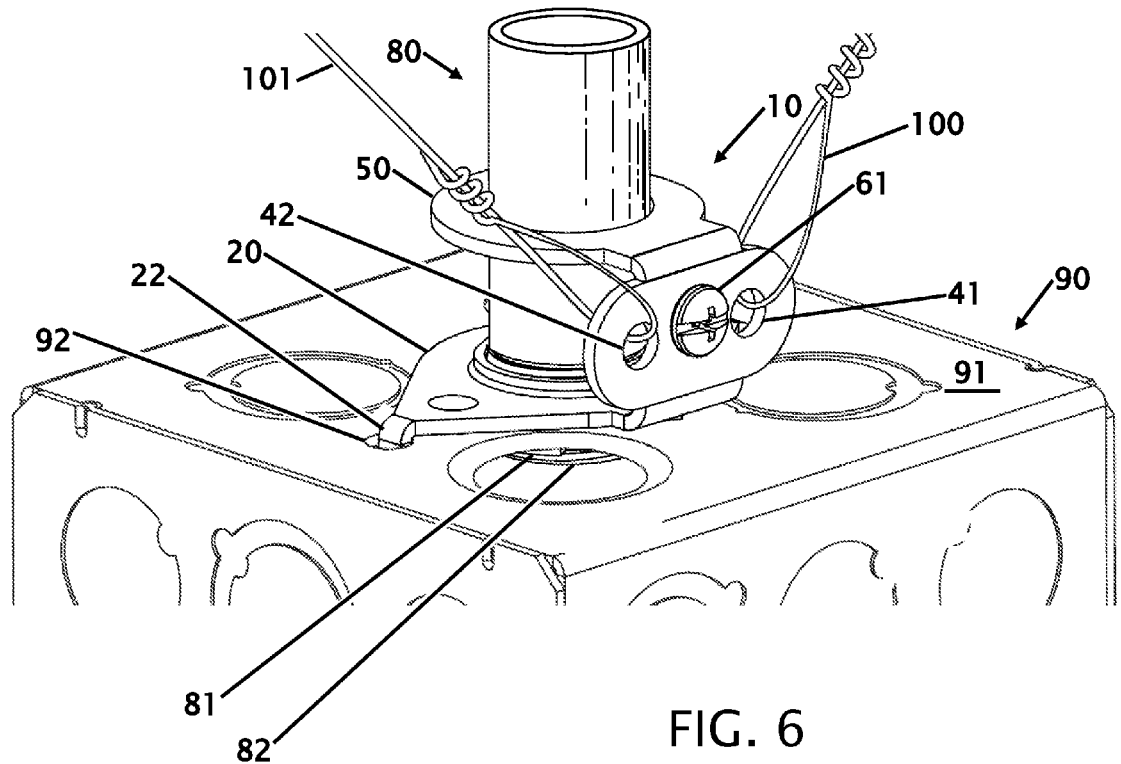
FIG. 6 shows a perspective view of the conduit locking connector on a junction box.

FIG. 6 shows a perspective view of the conduit locking connector 10 on a junction box 91. The rigid conduit 80 passes through an upper surface 50 and a lower surface 20 of the conduit locking connector 10 where the rigid conduit 80 is locked with the screw 61 fastener. The lower surface 20 of the conduit locking connector 10 has bent tabs 22 that are bent below the bottom surface of the lower surface 20 and engage into holes or openings 92 in the mounting surface 91 of the junction box 90. The threaded end 82 of the rigid conduit 80 is secured in the junction box 90 with a nut 81 that prevents vertical movement of the junction box 90 on the ridged conduit 80. Screw 61 engages into the rigid conduit 80 and prevents rotation of the conduit locking connector 10 on the rigid conduit 80. The amount of penetration of the rigid conduit 80 into the junction box 90 is adjustable depending upon where the conduit locking connector 10 is secured onto the rigid conduit. Holes 41 and 42 allow for the use of spring steel wire 100 and 101 to be tied and then secured to the surrounding environment. This will prevent the rigid conduit and the junction box 90 from swinging when the building is struck with a seismic event.

Thus, specific embodiments of a conduit locking connector have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. A conduit locking connector comprising:
    a planar bottom surface having a plurality of opposing lower tabs that extend perpendicular to said planar bottom surface and below said planar bottom surface;
    said bottom surface has a central hole;
    a vertical planar surface bent up from said bottom surface;
    said vertical planar surface having securing means for a fastener;
    a planar top surface bent from said vertical planar surface;
    said planar top surface having a central hole that is concentric with said central hole in said bottom surface, and
    said fastener pushes a conduit placed through said central hole in said planar bottom surface and said central hole in said planar top surface.

2. The conduit locking connector according to claim 1 wherein said plurality of tabs are bent from said planar bottom surface material.

3. The conduit locking connector according to claim 1 wherein a bearing surface is an elevated circular ring extending from within said central hole of said bottom surface towards said planar top surface.

4. The conduit locking connector according to claim 1 wherein said securing means has threads.

5. The conduit locking connector according to claim 1 wherein said conduit locking connector is metal.

6. The conduit locking connector according to claim 5 wherein said conduit locking connector is formed from a sheet of said metal.

7. The conduit locking connector according to claim 1 wherein said plurality of opposing lower tabs are adapted to fit into opposing openings of an electrical junction box.

8. The conduit locking connector according to claim 1 wherein said plurality of opposing lower tabs are adapted to prevent rotation of said junction box on said conduit locking connector.

9. The conduit locking connector according to claim 1 wherein said fastener essentially prevents rotation of said conduit within said conduit locking connector.

10. The conduit locking connector according to claim 1 wherein vertical planar surface has a plurality of through holes in-line with said fastener and on opposing sides of said fastener.

11. The conduit locking connector according to claim 10 wherein said bottom surface has plurality of through holes.

12. The conduit locking connector according to claim 11 wherein said plurality of holes in said bottom surface are placed outside a diameter of said planar top surface.

13. The conduit locking connector according to claim 1 wherein said fastener is a screw.

14. The conduit locking connector according to claim 1 wherein said screw is threaded into a tapped hole in said vertical surface.

15. The conduit locking connector according to claim 1 wherein said planar bottom surface is essentially diamond shaped wherein said plurality of lower tabs extend from opposing sides of said diamond shape.

16. The conduit locking connector according to claim 1 wherein said planar top surface is essentially round.

17. The conduit locking connector according to claim 1 wherein said conduit is a ridged conduit.

18. The conduit locking connector according to claim 7 wherein said junction box is metal.

19. The conduit locking connector according to claim 1 wherein conduit locking connector is electrically conductive.

20. The conduit locking connector according to claim 18 wherein conduit locking connector provides electrical grounding between said conduit and said junction box.

* * * * *